United States Patent
Dhanuka et al.

(10) Patent No.: US 10,540,741 B2
(45) Date of Patent: Jan. 21, 2020

(54) ANGULAR SNAPPING OF GRAPHICAL OBJECTS IN DIGITAL ARTBOARDS

(71) Applicant: Adobe Systems Incorporated, San Jose, CA (US)

(72) Inventors: Praveen Kumar Dhanuka, West Bengal (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/996,657

(22) Filed: Jun. 4, 2018

(65) Prior Publication Data

US 2019/0370931 A1    Dec. 5, 2019

(51) Int. Cl.
| | |
|---|---|
| *G06T 3/00* | (2006.01) |
| *G06T 11/60* | (2006.01) |
| *G06T 7/70* | (2017.01) |
| *G06T 7/13* | (2017.01) |

(52) U.S. Cl.
CPC .............. *G06T 3/0081* (2013.01); *G06T 7/13* (2017.01); *G06T 7/70* (2017.01); *G06T 11/60* (2013.01); *G06T 2210/12* (2013.01)

(58) Field of Classification Search
None
See application file for complete search history.

(56) References Cited

U.S. PATENT DOCUMENTS

2012/0026100 A1 * 2/2012 Migos ................ G06F 3/04883
345/173

* cited by examiner

*Primary Examiner* — Frank S Chen
(74) *Attorney, Agent, or Firm* — Kilpatrick Townsend & Stockton LLP

(57) ABSTRACT

Certain embodiments involve angular snapping of a target graphical object to a position in a digital artboard. For instance, a computing system determines a reference angle identifying an orientation of a target graphical object to be placed within an input graphic. The computing system also defines a tolerance region that overlaps the target graphical object and extends along an axis parallel to the reference angle. The computing system determines that at least two graphical objects are within the tolerance region. The computing system computes, for the target graphical object, a placement position on the axis. The placement position is computed based on a distance between the reference graphical objects. The computing system updates the graphical interface by placing the target graphical object within the input graphic at the placement position.

20 Claims, 7 Drawing Sheets

ANGULAR SNAPPING OF GRAPHICAL OBJECTS IN DIGITAL ARTBOARDS

TECHNICAL FIELD

This disclosure relates generally to graphic editing. More specifically, but not by way of limitation, this disclosure relates to angular snapping of a target graphical object to a position in a digital artboard based on the positions of reference graphical objects within a tolerance region on the digital artboard.

BACKGROUND

Graphic design and editing tools provide guides and constraints that allow users to align objects placed within images or other graphics. For instance, smart guide features are used to increase the precision with which graphical objects are aligned. An example of such a smart guide feature is an "Equal Spacing" constraint, which snaps a particular object with respect to two other objects such that there is equal spacing among the three objects. Current tools only allow users to apply an "Equal Spacing" constraint in the horizontal and vertical direction.

However, equal spacing among objects along an angular axis requires manual user inputs that are less effective and efficient than the automated solutions that exist for horizontal and vertical spacing. For example, a user could approximate, by hand, the proper placement position of a given object between two other objects. But this approximate placement lacks precision and is prone to error. Alternatively, a user could place multiple objects using the horizontal "Equal Spacing" constraint and then rotate the image to the desired angle. But this tedious place-and-rotate technique requires multiple rotation operations by the user as well as knowledge of the rotation angle necessary to bring the objects into alignment. Thus, when working with an existing image with objects already aligned to an angle, the user may have to approximate the rotations needed to bring the objects into horizontal alignment, which is also imprecise.

Even if the additional rotations could be done with precision, the final design appearance, with the objects aligned at an angle, will differ from the appearance displayed to the user when the object is being placed, with the objects aligned horizontally. Thus, after placing the object, a user would not be able to determine whether they are satisfied with the placement until the graphic is rotated. Thus, adjustments and corrections to the placement position would be tedious, as the extra rotational steps would need to be performed for each adjustment.

For these and other reasons, existing techniques for spacing graphical objects along an angular axis are insufficient.

SUMMARY

Certain embodiments involve placing graphical objects with an angular orientation in images by calculating placement positions based on distances from existing graphical objects within the image. For example, a computing system provides a graphical interface that displays an input graphic having at least two reference graphical objects. The system computes a reference angle identifying an orientation of a target graphical object to be placed within the input graphic. The computing system also defines a tolerance region that overlaps the target graphical object and extends along an axis parallel to the reference angle. The computing system determines that the reference graphical object are within the tolerance region. The computing system computes, for the target graphical object, a placement position on the axis. The placement position is computed based on a distance between the first reference graphical object and the second reference graphical object. The computing system updates the graphical interface by placing the target graphical object within the input graphic at the placement position.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
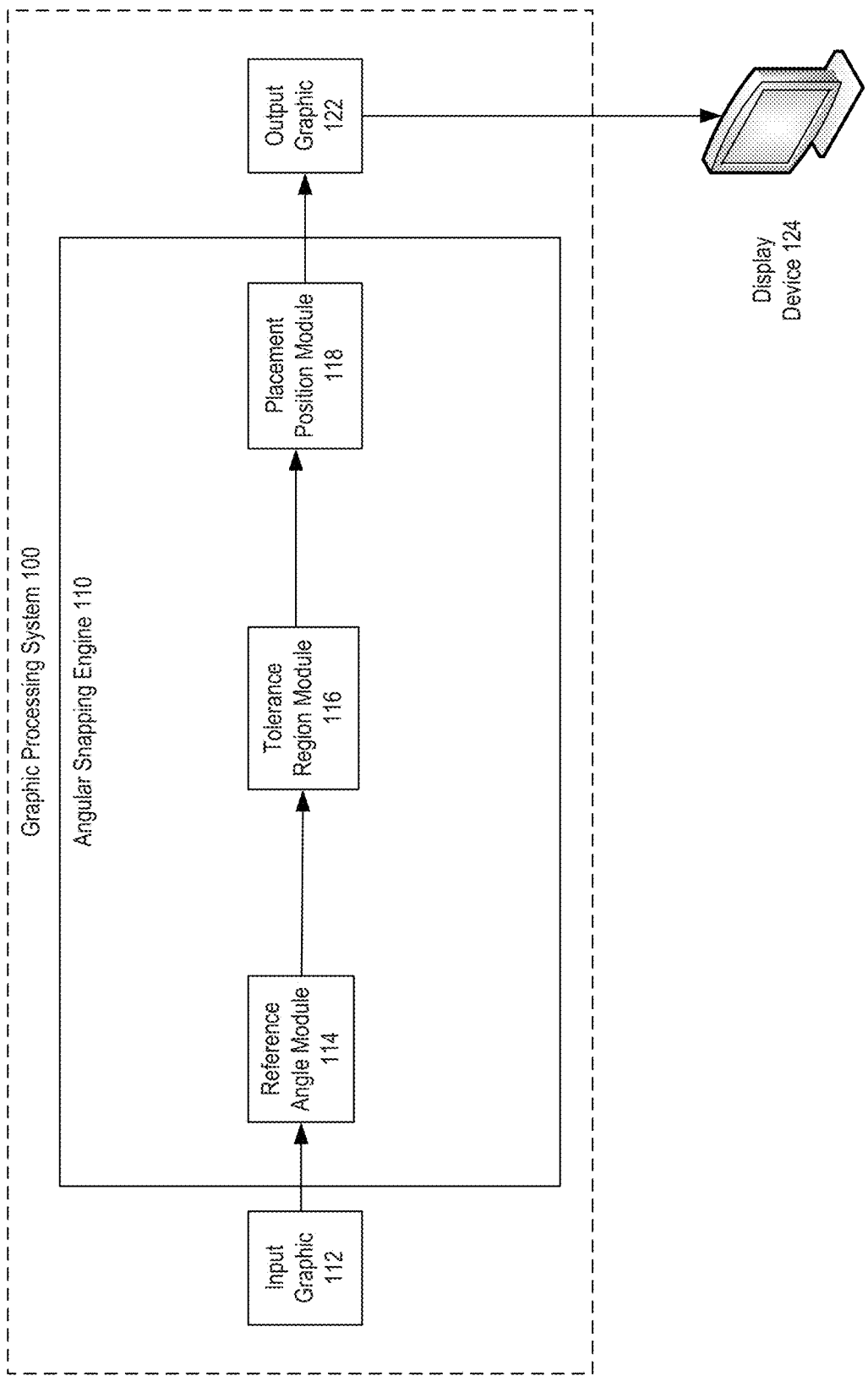
FIG. 1 depicts an example of a graphic processing system that performs angular snapping of a graphical object to a position in a digital artboard based on the positions of reference graphical objects within a tolerance region on the digital artboard, according to certain embodiments of the present disclosure.

Certain embodiments involve angular snapping of a target graphical object to a position in a digital artboard. For instance, a graphics editing application determines the orientation angle of a target graphic and reference graphical objects to use in order to calculate spacing. Based on the orientation and the reference graphical objects, the graphics editing application places a target graphical object at one of the calculated positions. By doing so, the graphics editing application automatically spaces graphical objects along an angular axis (e.g., an axis at an angle other 0 or 90 degrees) and thereby applies the angular equal spacing constraint in a single user interaction with the input graphic.

The following non-limiting example is provided to introduce certain embodiments. In this example, graphics editing application provides a graphical interface to display an input graphic containing two reference graphical objects to the user. When a user of a graphics editing application places a target graphics object in the input graphic, the graphics editing application computes a placement position for the target graphics object based on the distance between the two reference graphical objects. To do so, the graphics editing application computes a reference angle representing the orientation of the target graphical object. In this example, the target graphical object could be oriented at an angle of 30 degrees, which is used as the reference angle. Based on the orientation, the graphics editing application defines a tolerance region that overlaps with the target graphical object and that extends from the axis in a direction parallel to the reference angle. The tolerance region contains potential reference graphical objects to use in placing the target graphical object. For instance, the first reference graphical object could be above and to the right of the target graphic within the tolerance region extending along the 30 degree axis, and the second reference graphical object reference graphical object could be below and left of the target graphic within the same tolerance region.

Continuing with this example, the graphics editing application computes a placement position on demand on the axis for the target graphical object. The graphics editing application computes the placement position based on a distance between the first reference graphical object and the second reference graphical object. In this example, a placement position is calculated along the 30 degree axis. Because the two reference graphical objects are on opposite sides of the target graphical object, the calculated placement position is such that the distance from the target graphical object to one reference graphical object is equal to the distance from the target graphical object to the second reference graphical object. The graphics editing application updates the graphical interface by placing the target graphical object within the input graphic at the calculated placement position.

As described herein, certain embodiments provide improvements to graphics editing tools by allowing a user to place objects using an "angular equal spacing constraint" as opposed to the limitations found on the horizontal and vertical equal spacing constraints that exist in existing techniques. The use of angular equal spacing constraints can allow users to place objects with proper spacing with greater efficiency as compared to existing techniques. Additionally or alternatively, the use of angular equal spacing constraints can reduce or eliminate the need for manual rotation of graphical objects before and after object placement.

The use of these constraints is a technological improvements to methods of image editing only found in electronic graphics processing and differs in technique from editing of graphics done by hand. For instance, a physical image edited by hand would not have the capabilities of a digital image wherein the target graphic can be placed based on spacing between reference objects without manual measurements performed by the user.

As used herein, the term "angular snapping" is used to refer to a graphic-processing operation wherein an object within a graphic is placed at a calculated position relative to two other objects within the graphic.

As used herein, the term "graphic" is used to refer to electronic data that visually depicts one or more content items. Examples of a graphic include an electronic version of a photograph, one or more frames of electronic video content, electronic graphical content generated or modified with drawing tools, etc.

As used herein, the term "defines" used in the context of "defining a region" or "defining a line" is used to refer to determining the boundaries of a region or line without, in some cases, displaying the boundaries on the graphical user interface.

FIG. 1 depicts an example of a graphic processing system 100 that performs angular snapping of objects, according to some embodiments of the present disclosure. In this example, the graphic processing system 100 includes one or more computing devices for executing an angular snapping engine 110. The angular snapping engine 110 transforms an input graphic 112 into an output graphic 122 by placing various graphical objects within a digital artboard used to modify the input graphic 112. For instance, the angular snapping engine 110 computes the placement of a target graphical object via angular snapping. The angular snapping operation positions the target graphical object based on the positions and orientations of two or more reference graphical objects within a particular tolerance region. The display device 124 displays the resulting output graphic 122.

The angular snapping engine 110 includes a reference angle module 114. The reference angle module 114 computes the orientation of the target graphical object using a bounding box. In some embodiments, a bounding box is a minimum-sized boundary that can enclose a graphical object. For example, a bounding box could be a rectangle in which each side of the rectangle is positioned at an outermost point of a graphical object in a given direction. The reference angle module 114 also determines, based on the orientation, a reference angle to be used for angular snapping calculations. For instance, the reference angle module 114 could compute an angle between a horizontal plane and an edge of the bounding box. The reference angle module 114 could use this computed angle as the reference angle for angular snapping of the target graphical object.

In this example, the angular snapping engine 110 also includes a tolerance region module 116. The tolerance region module 116 identifies a set of reference graphical objects positioned within a digital artboard that the angular snapping engine 110 will use for angular snapping calculations. For example, the tolerance region module 116 computes a tolerance region, where the reference graphical objects are positioned within the tolerance region. In some embodiments, the tolerance region is a region within a threshold distance from an axis that passes through the center of (or otherwise intersects) the target graphical object and that is oriented at the reference angle computed by the reference angle module 114. In additional or alternative embodiments, the tolerance region is a region within a threshold distance from an axis that passes through the center of (or otherwise intersects) the target graphical object and that is oriented orthogonally to the reference angle computed by the reference angle module 114. As a user moves the target graphical object, the tolerance region module 116 updates the tolerance region and identifies objects within the tolerance region of the input graphic 112 for angular snapping calculations.

In some embodiments, the set of reference graphical objects includes fewer than all of the graphical objects of the input graphic 112 that are positioned on a digital artboard. Using the tolerance region to limit the number of reference graphical objects can reduce time and processing resources for computing potential placement locations of the target graphical object relative to the reference graphical objects. The reduced use of processing resources allows the graphic processing system 100 to operate more efficiently and direct computing resources to other operations.

In this example, the angular snapping engine 110 also includes a placement position module 118. The placement position module 118 computes a position of the target graphical object based on the distance between two reference graphical objects. In some embodiments, the two reference graphical objects are included in the tolerance region and are positioned along an axis based on the reference angle. The placement position module 118 adds the target graphical object to the input graphic 112 at the calculated position in order to generate an output graphic 122. Graphics processing system 100 renders the output graphic 122 for display at the display device 124.

In one example, the placement position module 118 computes a placement position that is at the halfway point of the distance between the two reference graphical objects. Thus, the placement position is at an equal distance from both the first reference graphical object and the second reference graphical object. In another example, the placement position module 118 computes a placement position that is at the same distance from one of the graphical objects as the distance between the two reference graphical objects. Thus, the placement position is adjacent to one of the reference graphical objects such that the target graphical object and the two reference graphical objects are evenly spaced from one another.

Figure 2:
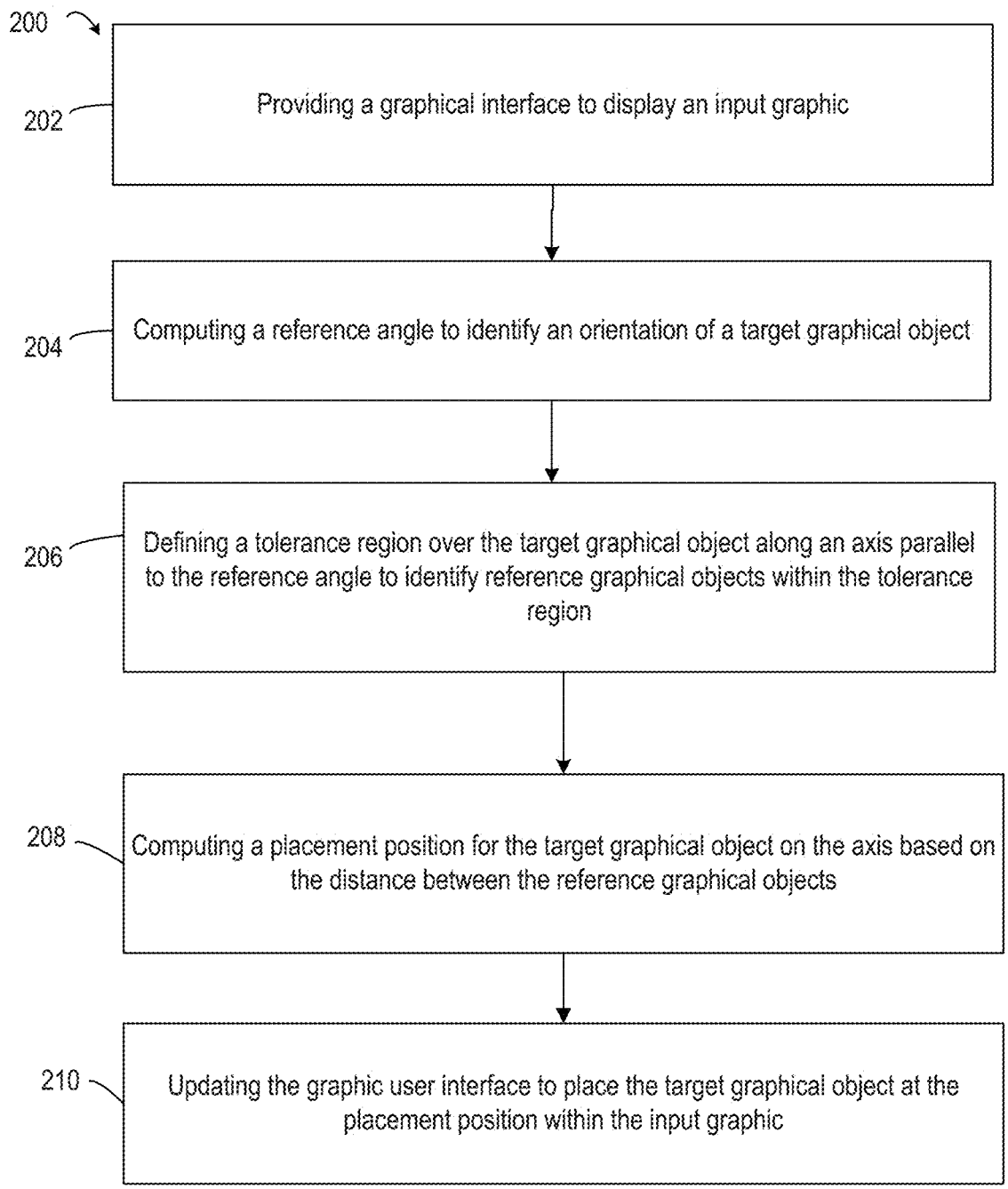
FIG. 2 depicts an example of a method for angular snapping of a target graphical object with respect to reference graphical objects within a tolerance region, according to certain embodiments of the present disclosure.

FIG. 2 depicts an example of a process 200, which may be performed by the graphic processing system 100 or another suitable computing system, for using an angular snapping engine 110 to determine a placement position for a target graphical object with respect to two reference graphical objects. For illustrative purposes, the process 200 is described with reference to certain examples depicted in the figures. For instance, in some embodiments, one or more processing devices implement operations depicted in FIG. 2 by executing suitable program code (e.g., the angular snapping engine 110). Other implementations, however, are possible.

At block 202, the process 200 provides a graphical interface to display the input graphic 112 data. One or more processing devices execute the angular snapping engine 110 (or suitable other program code) to implement block 202. Executing the angular snapping engine 110 causes one or more processing devices to access the input graphic 112 data that is stored in a non-transitory computer-readable medium. In some embodiments, accessing the input graphic 112 data involves communicating, via a data bus, suitable signals between a local non-transitory computer-readable medium and the processing device. In additional or alternative embodiments, accessing the input graphic 112 data involves communicating, via a data network, suitable signals between a computing system that includes the non-transitory computer-readable medium and a computing system that includes the processing device.

In some embodiments, the angular snapping engine 110 uses the process 200 to transform an input graphic 112 into an output graphic 122 by placing a target graphical object at a location within a set of graphical objects. For instance, at block 204, the process 200 uses the input graphic provided by block 202 to compute a reference angle that identifies the orientation of a target art object. One or more processing devices execute the angular snapping engine 110 or other program code to implement block 204. Executing the reference angle module 114 causes the processing device to perform a reference angle determination algorithm.

In some embodiments, the reference angle module 114 computes a reference angle for the target graphical object. The reference angle represents the orientation of the target art object. The reference angle may be determined based on a bounding box. The bounding box has two properties with respect to the target graphical object. One property is that each side is tangential to an outermost point of the target graphical object in that direction. Another property is that the bounding box has the minimum area necessary to enclose the target graphical object.

Figure 3:
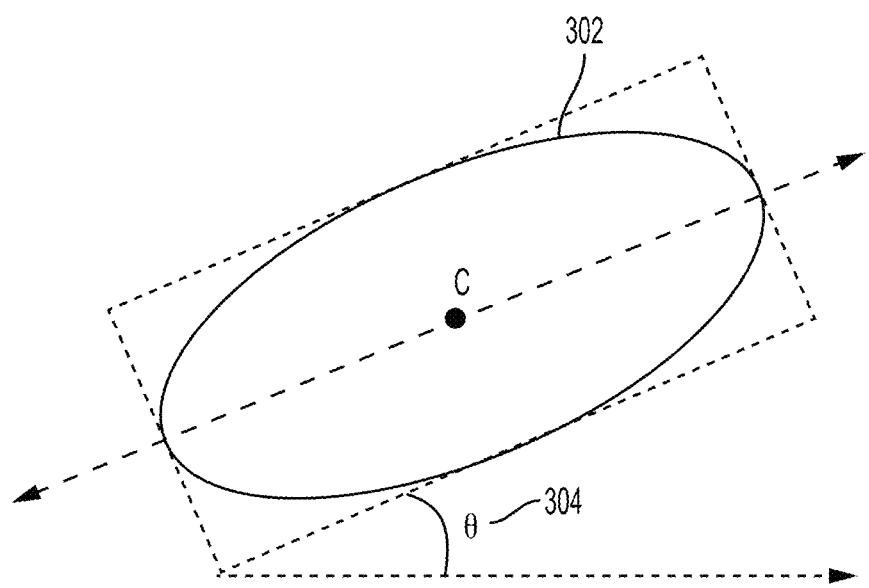
FIG. 3 depicts an example of computing the angle of an object using a bounding box, according to certain embodiments of the disclosure.

FIG. 3 depicts an example of a bounding box used to determine a reference angle. The target graphical object 302 is surrounded by a bounding box oriented along an axis represented by reference angle 304. Each side of the bounding box is tangential to the outermost point of the target graphical object 302 in that direction. The bounding box has the minimum area needed to enclose the target graphical object 302. The bounding box that determines the reference angle is unique to a target graphical object, as bounding boxes drawn at angles other than the reference angle around the target graphical object, even if each side is tangential to the target graphical object, will have an area greater than the bounding box.

In an additional or alternative embodiment, the reference angle is specified by the user. In this embodiment, the bounding box may not be of the minimum area needed to enclose the target graphical object 302.

Returning to FIG. 2, at block 206, the process 200 using the computed reference angle to define a tolerance region over the target graphical object along an axis parallel to the reference angle. One or more processing devices execute the angular snapping engine 110 or other program code to implement block 206. Executing the tolerance region module 116 causes the processing device to perform a tolerance region determination algorithm.

In some embodiments, at block 206, the tolerance region module 116 defines the tolerance region that is used to identify reference graphical objects. The tolerance region is defined by a region that extends from the axis running through the center of the target graphical object and is parallel to the reference angle. In some embodiments, the defined region may not be displayed on the graphical user interface. The distance the tolerance region extends from the axis may be predetermined, or may be calculated based on the size of the target graphical object.

Figure 4:
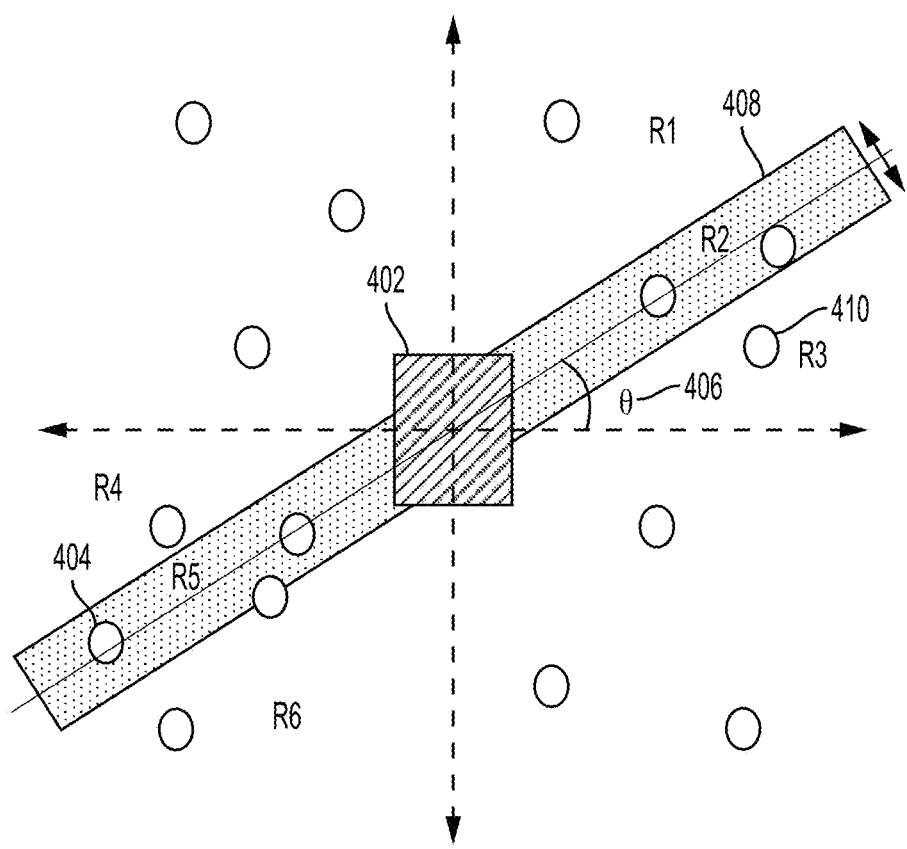
FIG. 4 depicts an example of limiting a search space for angular snapping computations, according to certain embodiments of the present disclosure.

FIG. 4 depicts an example of graphical objects in a graphical image and the tolerance region 408 associated with a target graphical object 402. In this example, target graphical object 402 is being placed in a graphical image. The reference angle 406 has been calculated by the reference angle module 114. The tolerance region 408 is a region extending from the axis running through the center of the target graphical object 402 at reference angle 406. In this example, the tolerance region module 116 uses graphical objects within the tolerance region, such as graphical object 404, as potential reference graphical objects, and excludes graphical objects outside of the tolerance region, such as graphical object 410. In additional or alternative embodiments, the tolerance region is a region within a threshold distance from an axis that passes through the center of (or otherwise intersects) the target graphical object and that is oriented orthogonally to the reference angle computed by the reference angle module 114.

In some embodiments, once the tolerance region is defined, the tolerance region module 116 divides potential reference graphical objects within the tolerance region into two categories based on their location with respect to the target graphical object. In one example, each potential reference graphical object is identified as being located in the target graphical object's top-right zone or the bottom-left zone. In an additional or alternative example, each potential reference graphical object is identified as being located in the target graphical object's top-left zone or the bottom-right zone.

In an additional or alternative embodiment, the tolerance region module 116 defines a line between the center of the target graphical object and the center of each potential reference graphical object. The tolerance region module 116 considers a potential reference graphical object to be in the tolerance region if the line drawn between the center of the target graphical object and the center of the potential reference graphical object is parallel to the reference angle.

In some embodiments, the tolerance region module 116 stores each potential reference graphical object in a list. The tolerance region module 116 maintains a separate list for potential reference graphical objects in the top-right zone and for potential reference graphical objects in the bottom-left zone. The list may be sorted based on distance from the target graphical object. In an additional or alternative embodiment, the tolerance region module 116 maintains the lists for potential reference graphical objects in the top-left zone and in the bottom-right zone.

Returning to FIG. 2, at block 208, the process 200 involves computing a placement position for the target graphical object using the output of block 206. One or more processing devices execute the angular snapping engine 110 or other program code to implement block 208. Executing the placement position module 118 causes the processing device to perform a tolerance region determination algorithm.

In some embodiments, at block 208, the placement position module 118 determines the placement position of the target graphical object based on two factors. A first factor is the location of the two reference graphical objects with respect to the target graphical object. A second factor is either the distance of the target graphical object to each of the two reference graphical objects or the distance of the two reference graphical objects to each other. For example, if the two reference graphical objects are on opposite sides of the target graphical object, then the placement position is based on the distance between the target graphical object to each of the two reference graphical objects. The placement position module 118 will place the target graphical object on the axis parallel to the reference angle such that the distance between the target graphical object and the first reference object is equal to the distance between the target graphical object and the second reference object.

Figure 5:
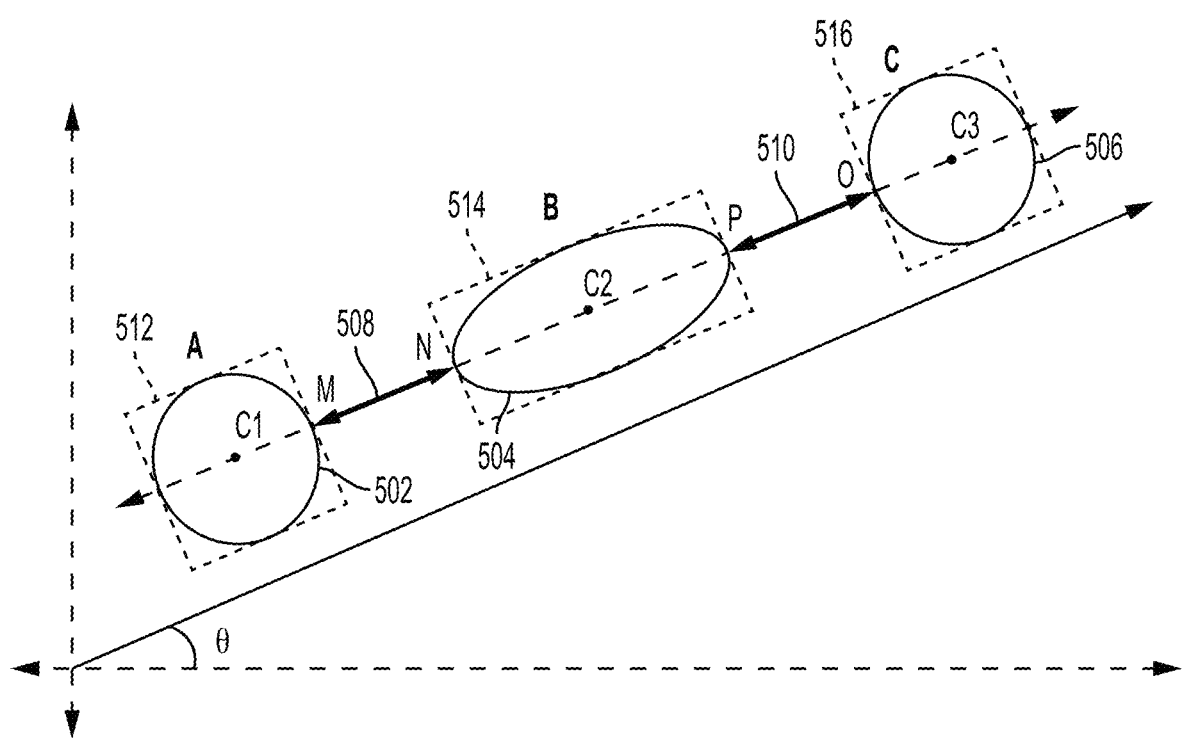
FIG. 5 depicts an example of the results generated by the graphic processing system of FIG. 1 for the placement of a target graphical object between two reference art objects, according to certain embodiments of the present disclosure.

FIG. 5 depicts an example of the placement position of a target graphical object 504 with respect to two reference graphical objects 502 and 506. In this example, the first reference graphical object 502 is on one side of the target graphical object 504 and the second reference graphical object 506 is on the other side of the target graphical object 504. The target graphical object 504 will be placed such that the distance 508 between the target graphical object 504 and the first reference graphical object 502 is the same as the distance 510 between the target graphical object 504 and the second graphical object 506.

In some embodiments, to measure the distance between each reference graphical object and the target graphical object, the placement position module 118 defines a first bounding box 512 around the first reference graphical object and a second bounding box 516 around the second reference graphical object, each at an orientation parallel to the reference angle. The distance between the first reference graphical object 502 and the target graphical object 504 is the line defined between the midpoint of the edge of the first bounding box 512 on the side closest to the target graphical object 504 to the midpoint of the edge of the bounding box of the target graphical object 514 on the side closest to the first reference graphical object 502. The distance between the second reference graphical object 502 and the target graphical object 504 is the line defined between the midpoint of the edge of the second bounding box 516 on the side closest to the target graphical object 504 to the midpoint of the edge of the bounding box of the target graphical object 514 on the side closest to the second reference graphical object 506. In some embodiments, the graphics processing system 100 draws these lines on the graphical user interface so the user can identify the reference graphical objects used in the placement.

In some embodiments, the placement position module calculates the midpoint of the edge of a bounding box by first extracting the height and width of the bounding box, and then using the height and width of the bounding box. The following formula provides an example of calculating midpoints:

$$\text{Midpoint}_{TopRight}(x, y) = \left\{\left(x_c + \left(\frac{w}{2}\right)*\cos\theta\right), \left(y_c + \left(\frac{w}{2}\right)*\sin\theta\right)\right\}$$

$$\text{Midpoint}_{BottomLeft}(x, y) = \left\{\left(x_c - \left(\frac{w}{2}\right)*\cos\theta\right), \left(y_c - \left(\frac{w}{2}\right)*\sin\theta\right)\right\}$$

$$\text{Midpoint}_{TopLeft}(x, y) = \left\{\left(x_c - \left(\frac{h}{2}\right)*\sin\theta\right), \left(y_c + \left(\frac{h}{2}\right)*\cos\theta\right)\right\}$$

$$\text{Midpoint}_{BottomRight}(x, y) = \left\{\left(x_c + \left(\frac{h}{2}\right)*\sin\theta\right), \left(y_c - \left(\frac{h}{2}\right)*\cos\theta\right)\right\}$$

In this formula, $(x_c, y_c)$ represents the center of the bounding box, h represents the height of the bounding box, w represents the width of the bounding box, and $\theta$ represents the reference angle. In some embodiments, the midpoint positions are calculated on demand and cached after calculation for reuse, which may include when the target graphical object 504 is selected again for placement.

In some embodiments, the placement position module 118 uses a sorted list of potential graphical reference objects to more efficiently select the first and second graphical reference objects to select. For each graphical reference object in the top-right zone list, the placement position module 118 determines the distance between the first graphical reference object and the target graphical object, and a binary search can be used to determine which object in the bottom-left zone list is closest in distance to use as the second reference graphical object for calculating placement of the target graphical object. In some embodiments, the distances are calculated on-demand as a user moves the target graphical object within the image and cached after calculation for reuse, which may include when the target graphical object 504 is selected again for placement.

In an alternative example, if the two reference graphical objects are both on the same side as the target graphical object, then the placement position module 118 bases the placement position on the distance between the two reference graphical objects. The placement position module 118 will place the target graphical object on the axis parallel to the reference angle at a distance from the closest reference graphical object that corresponds or is equal to the distance between the two reference graphical objects.

Figure 6:
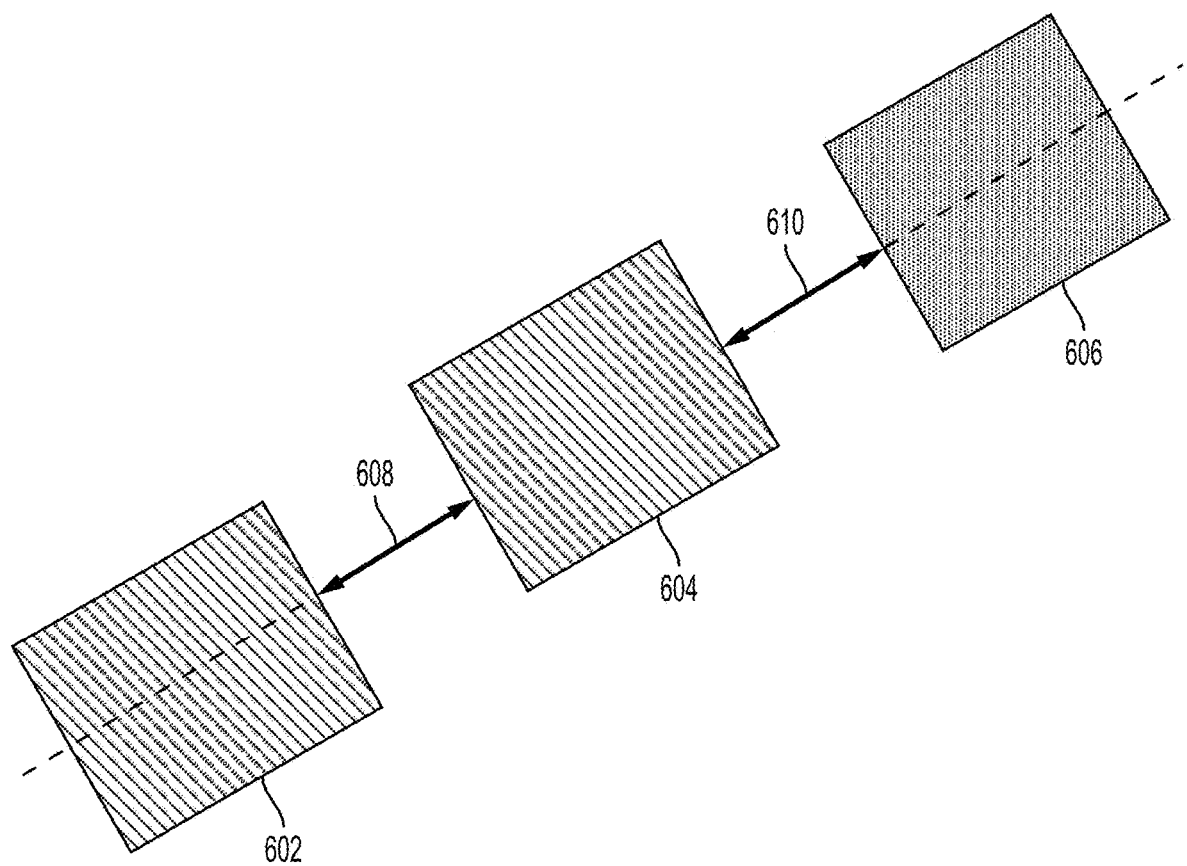
FIG. 6 depicts an example of the results generated by the graphic processing system of FIG. 1 for placement of a target graphical object at a distance equal to the distance between two reference graphical objects, according to certain embodiments of the present disclosure.

FIG. 6 depicts an example of the placement position of a target graphical object 606 with respect to two reference graphical objects 602 and 604. In this example, both reference graphical objects 602 and 604 are on the same side relative to target graphical object 606. The target graphical object 606 will be placed such that the distance 610 between the target graphical object 606 and the second reference graphical object 604 is the same as the distance 608 between the first graphical object 602 and the second graphical object 604.

In some embodiments, to measure the distance between the two reference graphical objects and the distance between the second reference graphical object and the target graphical object, the placement position module 118 defines a first bounding box around the first reference graphical object and a second bounding box around the second reference graphical object, each at an orientation parallel to the reference angle. The distance between the first reference graphical object 602 and the second reference graphical object 604 is the line defined between the midpoint of the edge of the first bounding box on the side closest to the second graphical object 604 to the midpoint of the edge of the second bounding box on the side closest to the first reference graphical object 602. The distance between the second reference graphical object 604 and the target graphical object 606 is the line defined between the midpoint of the edge of the second bounding box on the side closest to the target graphical object 606 to the midpoint of the edge of the target bounding box on the side closest to the second reference graphical object 604. In some embodiments, the placement position module 118 draws these lines on the graphical user interface so the user can identify the reference graphical objects used in the placement.

In some embodiments, the placement position module 118 uses a sorted list of potential graphical reference objects to more efficiently select the first and second graphical reference objects to select. For each graphical reference object in the bottom-left zone list, the placement position module 118 determines the distance between the first graphical reference object and the target graphical object, and a binary search can be used to determine which object in the bottom-left zone list is closest to half the distance between the first graphical reference object and the target graphical object to use as the second reference graphical object for calculating placement of the target graphical object. In some embodiments, the distances are calculated on-demand as a user moves the target graphical object within the image and cached after calculation for reuse, which may include when the target graphical object 606 is selected again for placement.

Returning to FIG. 2, at block 210, the process 200 involves taking the output of block 208 and updating the graphic user interface to place the target art object within the input graphic 112 at the position determined by the placement position module 118. In some embodiments, the input graphic 112 is displayed on the graphic user interface, such as a display device 124. The target graphical object is placed by the user using blocks 202-208. At block 210, the input graphic 112 data is updated by overlaying the target graphical object data at the placement position determined at block 208. The updated input graphic 112 data is rendered and transmitted to the display device 124 for display.

Example of a Computing System for Implementing Certain Embodiments

Figure 7:
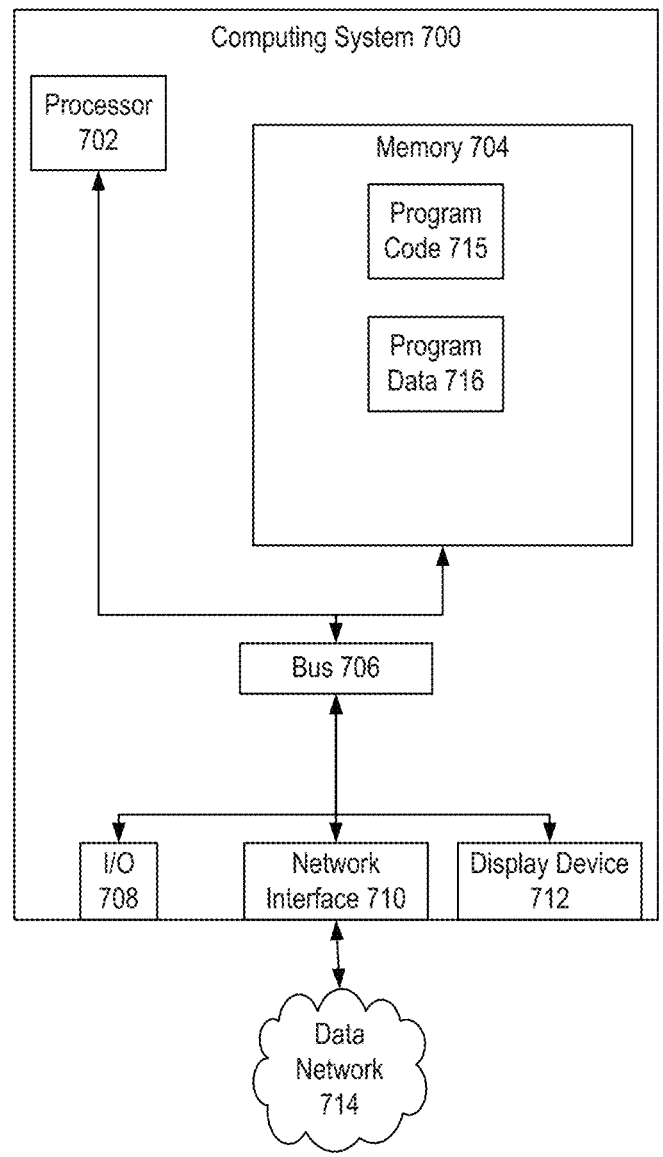
FIG. 7 depicts an example of a computing system for implementing one or more embodiments of the present disclosure.

Any suitable computing system or group of computing systems can be used for performing the operations described herein. For example, FIG. 7 depicts an example of the computing system 700. The implementation of computing system 700 could be used for a graphic processing system 100.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing program code 715, program data 716, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as input or output devices. For example, the computing system 700 is shown with one or more input/output ("I/O") interfaces 708. An I/O interface 708 can receive input from input devices or provide output to output devices, such as a presentation device 712. One or more buses 706 are also included in the computing system 700. The bus 706 communicatively couples one or more components of a respective one of the computing system 700.

The computing system 700 executes program code 715 that configures the processor 702 to perform one or more of the operations described herein. Examples of the program code 715 include, in various embodiments, the angular snapping engine 110 or other suitable applications that perform one or more operations described herein. The program code may be resident in the memory device 704 or any suitable computer-readable medium and may be executed by the processor 702 or any other suitable processor.

The computing system 700 can access program data 716 (e.g., an input graphic 112) in any suitable manner. In some embodiments, one or more of these data sets, models, and functions are stored in the same memory device (e.g., one of the memory devices 704). In additional or alternative embodiments, one or more of the programs, data sets, models, and functions described herein are stored in different memory devices 704 accessible via a data network.

The computing system 700 also includes a network interface device 710. The network interface device 710 includes any device or group of devices suitable for establishing a wired or wireless data connection to one or more data networks 714. Non-limiting examples of the network interface device 710 include an Ethernet network adapter, a modem, etc. The computing system 700 is able to communicate with one or more other computing devices via a data network 714 using the network interface device 710. Examples of the data network 714 include, but are not limited to, the internet, a local area network, a wireless area network, a wired area network, a wide area network, and the like.

In some embodiments, the computing system 700 also includes the presentation device 712 depicted in FIG. 7. A presentation device 712 can include any device or group of devices suitable for providing visual, auditory, or other suitable sensory output (e.g., display device 124). Non-limiting examples of the presentation device 712 include a touchscreen, a monitor, a speaker, a separate mobile computing device, etc. In some aspects, the presentation device 712 can include a remote client-computing device that communicates with the computing system 700 using one or more data networks described herein. Other aspects can omit the presentation device 712.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices performs operations comprising:
    providing a graphical interface that displays an input graphic comprising a first reference graphical object and a second reference graphical object;
    computing a reference angle identifying an orientation of a target graphical object to be placed within the input graphic;
    defining a tolerance region that overlaps the target graphical object and extends along an axis parallel to the reference angle;
    determining that the first reference graphical object and the second reference graphical object are within the tolerance region;
    computing, for the target graphical object, a placement position on the axis, wherein the placement position is computed based on a distance between the first reference graphical object and the second reference graphical object; and
    updating the graphical interface by placing the target graphical object within the input graphic at the placement position.

2. The method of claim 1, wherein computing the placement position comprises:
    defining a first bounding box around the first reference graphical object, wherein the first bounding box has at least one edge with the orientation identified by the reference angle;
    defining a second bounding box around the second reference graphical object, wherein the second bounding box has at least one edge with the orientation identified by the reference angle;
    identifying a first edge from the first bounding box based on the first edge being closer to the second bounding box than other edges of the first bounding box; and
    identifying a second edge from the second bounding box based on the second edge being closer to the first bounding box than other edges of the second bounding box;
    wherein the distance between the first reference graphical object and the second reference graphical object is the distance between the first edge and the second edge.

3. The method of claim 2, wherein the placement position is a mid-point position that is along the axis and equidistant from the first reference graphical object and the second reference graphical object.

4. The method of claim 2, wherein the placement position is a position that is at an additional distance from the first reference graphical object or the second reference graphical object that corresponds to the distance between the first reference graphical object and the second reference graphical object.

5. The method of claim 1, wherein the reference angle identifies the orientation as having a horizontal component unaligned with a horizontal axis with respect to the graphical interface and a vertical component unaligned with a vertical axis with respect to the graphical interface.

6. The method of claim 1, wherein the placement position is a mid-point position that is along the axis and equidistant from the first reference graphical object and the second reference graphical object.

7. The method of claim 1, wherein the placement position is a position that is at an additional distance from the first reference graphical object or the second reference graphical object that corresponds to the distance between the first reference graphical object and the second reference graphical object.

8. A system comprising:
a processing device; and
a non-transitory computer-readable medium communicatively coupled to the processing device, wherein the processing device is configured to execute program code stored in the non-transitory computer-readable medium and thereby perform operations comprising:
providing a graphical interface that displays an input graphic comprising a first reference graphical object and a second reference graphical object,
computing a reference angle identifying an orientation of a target graphical object to be placed within the input graphic,
defining a tolerance region that overlaps the target graphical object and extends along an axis parallel to the reference angle,
determining that the first reference graphical object and the second reference graphical object are within the tolerance region,
computing, for the target graphical object, a placement position on the axis, wherein the placement position is computed based on a distance between the first reference graphical object and the second reference graphical object, and
updating the graphical interface by placing the target graphical object within the input graphic at the placement position.

9. The system of claim 8, wherein computing the placement position comprises:
defining a first bounding box around the first reference graphical object, wherein the first bounding box has at least one edge with the orientation identified by the reference angle;
defining a second bounding box around the second reference graphical object, wherein the second bounding box has at least one edge with the orientation identified by the reference angle;
identifying a first edge from the first bounding box based on the first edge being closer to the second bounding box than other edges of the first bounding box; and
identifying a second edge from the second bounding box based on the second edge being closer to the first bounding box than other edges of the second bounding box;
wherein the distance between the first reference graphical object and the second reference graphical object is the distance between the first edge and the second edge.

10. The system of claim 9, wherein the placement position is a mid-point position that is along the axis and equidistant from the first reference graphical object and the second reference graphical object.

11. The system of claim 9, wherein the placement position is a position that is at an additional distance from the first reference graphical object or the second reference graphical object that corresponds to the distance between the first reference graphical object and the second reference graphical object.

12. The system of claim 8, wherein the reference angle identifies the orientation as having a horizontal component unaligned with a horizontal axis with respect to the graphical interface and a vertical component unaligned with a vertical axis with respect to the graphical interface.

13. The system of claim 8, wherein the placement position is a mid-point position that is along the axis and equidistant from the first reference graphical object and the second reference graphical object.

14. The system of claim 8, wherein the placement position is a position that is at an additional distance from the first reference graphical object or the second reference graphical object that corresponds to the distance between the first reference graphical object and the second reference graphical object.

15. A non-transitory computer-readable medium having program code that is stored thereon, the program code executable by one or more processing devices for performing operations comprising:
providing a graphical interface that displays an input graphic comprising a first reference graphical object and a second reference graphical object;
computing a reference angle identifying an orientation of a target graphical object to be placed within the input graphic;
defining a tolerance region that overlaps the target graphical object and extends along an axis parallel to the reference angle;
determining that the first reference graphical object and the second reference graphical object are within the tolerance region;
computing, for the target graphical object, a placement position on the axis, wherein the placement position is computed based on a distance between the first reference graphical object and the second reference graphical object; and
updating the graphical interface by placing the target graphical object within the input graphic at the placement position.

16. The non-transitory computer-readable medium of claim 15, wherein computing the placement position comprises:
defining a first bounding box around the first reference graphical object, wherein the first bounding box has at least one edge with the orientation identified by the reference angle;
defining a second bounding box around the second reference graphical object, wherein the second bounding box has at least one edge with the orientation identified by the reference angle;
identifying a first edge from the first bounding box based on the first edge being closer to the second bounding box than other edges of the first bounding box; and
identifying a second edge from the second bounding box based on the second edge being closer to the first bounding box than other edges of the second bounding box;
wherein the distance between the first reference graphical object and the second reference graphical object is the distance between the first edge and the second edge.

17. The non-transitory computer-readable medium of claim 16, wherein the placement position is a mid-point position that is along the axis and equidistant from the first reference graphical object and the second reference graphical object.

18. The non-transitory computer-readable medium of claim 16, wherein the placement position is a position that is at an additional distance from the first reference graphical object or the second reference graphical object that corresponds to the distance between the first reference graphical object and the second reference graphical object.

19. The non-transitory computer-readable medium of claim 15, wherein the reference angle identifies the orientation as having a horizontal component unaligned with a horizontal axis with respect to the graphical interface and a vertical component unaligned with a vertical axis with respect to the graphical interface.

20. The non-transitory computer-readable medium of claim 15, wherein the placement position is a mid-point position that is along the axis and equidistant from the first reference graphical object and the second reference graphical object.

* * * * *